(12) United States Patent
Zhang et al.

(10) Patent No.: US 12,085,781 B2
(45) Date of Patent: Sep. 10, 2024

(54) COMPLEX REFLECTOR DEVICE TO GENERATE ARBITRARY NUMBER OF OUTPUT BEAMS IN ANGULAR SPACE THROUGH SAME EXIT PUPIL

(71) Applicant: MLOptic Corp, Redmond, WA (US)

(72) Inventors: Teresa Zhang, Albany, NY (US); Wei Zhou, Sammamish, WA (US); Jiang He, Nanjing (CN); Siyuan Liang, Nanjing (CN)

(73) Assignee: MLOptic Corp., Redmond, WA (US)

( * ) Notice: Subject to any disclaimer, the term of this patent is extended or adjusted under 35 U.S.C. 154(b) by 475 days.

(21) Appl. No.: 17/561,602

(22) Filed: Dec. 23, 2021

(65) Prior Publication Data
US 2023/0204904 A1    Jun. 29, 2023

(51) Int. Cl.
G02B 27/14    (2006.01)
G02B 7/182    (2021.01)

(52) U.S. Cl.
CPC .......... *G02B 7/1821* (2013.01); *G02B 27/14* (2013.01)

(58) Field of Classification Search
CPC .... G02B 7/1821; G02B 27/14; G02B 27/144; G02B 26/0816; G02B 27/0977; G02B 27/106; G02B 2027/0125; H01L 27/1462
See application file for complete search history.

(56) References Cited

U.S. PATENT DOCUMENTS

2020/0150332 A1* 5/2020 Nakamura ........... G02B 27/145

* cited by examiner

*Primary Examiner* — Ryan D Howard
(74) *Attorney, Agent, or Firm* — Jong Patent Firm; Cheng Ning Jong; Tracy P. Jong

(57) ABSTRACT

A device for providing an output beam in a direction, the device including a plate including an exit pupil; a plurality of rows of optical elements disposed substantially in a first plane, each row of optical elements in the first plane including: at least one beam splitter; and a plurality of rows of optical elements disposed substantially in a second plane, the optical elements in the second plane include mirrors, wherein the second plane is disposed between the exit pupil and the first plane, wherein the at least one beam splitter at the first plane is configured to transmit an incident beam to one of a subsequent optical element at the first plane and a subsequent optical element at the second plane before being reflected to exit through the exit pupil.

13 Claims, 5 Drawing Sheets

COMPLEX REFLECTOR DEVICE TO GENERATE ARBITRARY NUMBER OF OUTPUT BEAMS IN ANGULAR SPACE THROUGH SAME EXIT PUPIL

BACKGROUND OF THE INVENTION

1. The Field of the Invention

The present invention relates to a device for providing an arbitrary number of output beams simultaneously. More specifically, the present invention is directed to a device for providing an arbitrary number of output beams rapidly with only one input beam.

2. Background Art

Tremendous efforts may be required to first construct a specialized mounting or alignment jig to allow alignment/s to be made before any tests and calibration practices can be carried out in the testing or calibration of an optical equipment having entrance pupil/s that are incapable to be aligned with the mounting ports of an optical testing tool to yield one or more incoming beams that can be aligned in the direction/s expected of the one or more incoming beams into the entrance pupil/s of the equipment. Further, in the fields of Augmented Reality/Virtual Reality/Mixed Reality (AR/VR/MR) and magnified imaging, optical metrology is carried out in the angular domain, therefore requiring the capability of disposing light beams in various directions. Further, in applications requiring pupil matching to be performed between the light beams output devices and the entrance pupil of optical instrument to be tested or calibrated, the ability to direct light beams at will is critical. Existing solutions include using multi-axis platform-mounted total stations that are not only large in their form factor but also difficult to use and costly to procure.

There exists a need for a device capable of providing an arbitrary number of light beams in selected directions to remove the need to make position and orientation adjustments to either one or both of the equipment to be tested or calibrated and the optical testing tool.

SUMMARY OF THE INVENTION

In accordance with the present invention, there is provided a device for providing an output beam in a direction, the device including:
(a) a plate including an exit pupil;
(b) a plurality of rows of optical elements disposed substantially in a first plane, each row of optical elements in the first plane including: at least one beam splitter; and
(c) a plurality of rows of optical elements disposed substantially in a second plane, the optical elements in the second plane include mirrors, wherein the second plane is disposed between the exit pupil and the first plane,
wherein the at least one beam splitter at the first plane is configured to transmit an incident beam to one of a subsequent optical element at the first plane and a subsequent optical element at the second plane before being reflected to exit through the exit pupil.

In one embodiment, at least one of the optical elements of the plurality of rows of optical elements in the first plane is an optical element disposed in two degrees of freedom in its movement and at least one of the optical elements of the plurality of rows of optical elements in the second plane is an optical element disposed in five degrees of freedom in its movement. In one embodiment, the two degrees of freedom includes tip and tilt and the five degrees of freedom includes X, Y, Z, tip and tilt, wherein said X, Y and Z-directions are mutually orthogonal and said tip is a rotation about said X-direction and said tilt is a rotation about said Y-direction. In one embodiment, all of the plurality of rows of optical elements in the second plane are mirrors. In one embodiment, at least one of the plurality of rows of optical elements in the first plane is configured to be aligned with a row of the plurality of rows of optical elements in the second plane. In one embodiment, the exit pupil is disposed in a circular shape and at a diameter of about 1-2 mm. In one embodiment, at least one of the plurality of rows of optical elements in the first plane includes three optical elements and at least one of the plurality of rows of optical elements of the second plane includes three optical elements.

An object of the present invention is to provide a device capable of providing an arbitrary number of output beams simultaneously in precise directions.

Another object of the present invention is to provide an output beam that is off-normal.

Another object of the present invention is to provide an output beam that is off-normal where there is high confidence of that the output beam is provided in a precise direction.

Another object of the present invention is to provide an arbitrary number of output beams without requiring a large setup.

Another object of the present invention is to provide an output beam at an arbitrary direction with limited movements of optical components.

Another object of the present invention is to provide a device which allows pupil matching to occur between the device and the entrance pupil of the optical instrument to be tested or calibrated to avoid vignettes, etc.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST 2-reflector device
4-beam splitter
6-mirror
8-incident light to beam splitter
10-transmitted light of beam splitter
12-reflected light of beam splitter
14-row
16-column
18-entrance pupil
20-reflected light of mirror
22-exit pupil
24-possible footprint coverage
26-light source
28-equipment to be calibrated
30-orientation of equipment to be calibrated
32-equipment having been calibrated
34-orientation of equipment having been calibrated
36-top plate
38-first plane
40-second plane
42-equipment
44-equipment

PARTICULAR ADVANTAGES OF THE INVENTION

The present device is a compact light beam-directing device capable of providing an arbitrary number of output beams through an exit pupil such that a request for an off-normal beam for calibration or other alignment purposes can be met.

As the present device uses a small exit pupil, it is highly improbable for an output beam that has been incorrectly produced to exit the device. Therefore, if an expected output beam fails to be produced, the device simply does not allow the incorrectly produced output beam to be provided to the user. This prevents an incorrectly produced output beam to be inadvertently used.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 1:
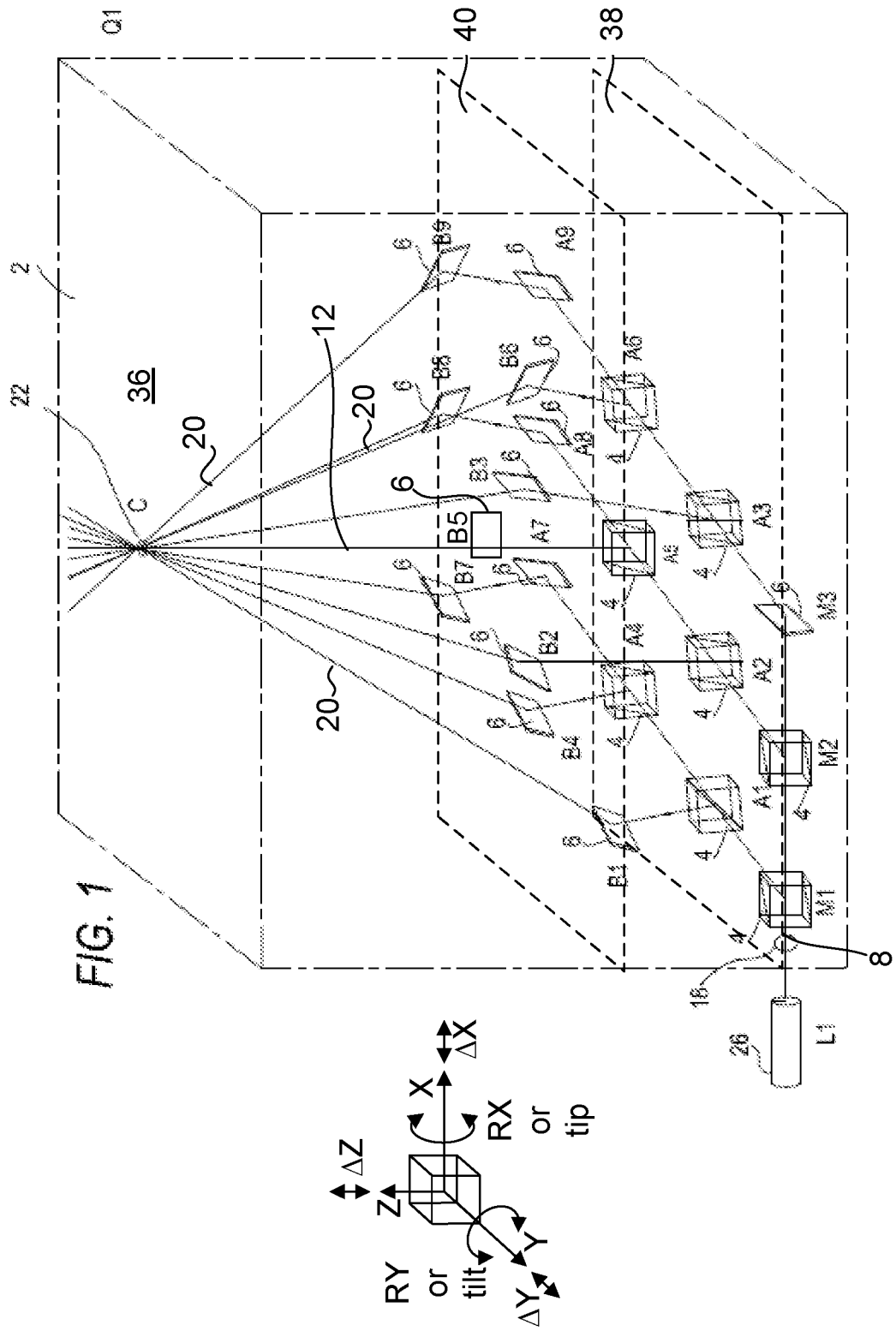
FIG. 1 is a diagram depicting a present reflector device configured for receiving a light beam and delivering an arbitrary number of output beams.

FIG. 1 is a diagram depicting a present reflector device 2 configured for receiving a light beam 26 at an entrance pupil 18 and delivering an arbitrary number of output beams 12, 20 through an exit pupil 22. The device 2 includes a plate 36, a plurality of rows of optical elements 4, 6 disposed substantially in a first plane 38 and a plurality of rows of optical elements 6 disposed substantially in a second plane 40. The plate 36 includes the exit pupil 22. Each row of optical elements in the first plane includes at least one beam splitter 4 for transmitting an incident light beam downstream within the same plane or to the second plane. The optical elements in the second plane include mirrors. The second plane is disposed between the exit pupil 22 and the first plane. At least one beam splitter 4 at the first plane is configured to transmit an incident beam to one of a subsequent optical element at the first plane and a subsequent optical element at the second plane before being reflected to exit through the exit pupil 22.

Figure 2:
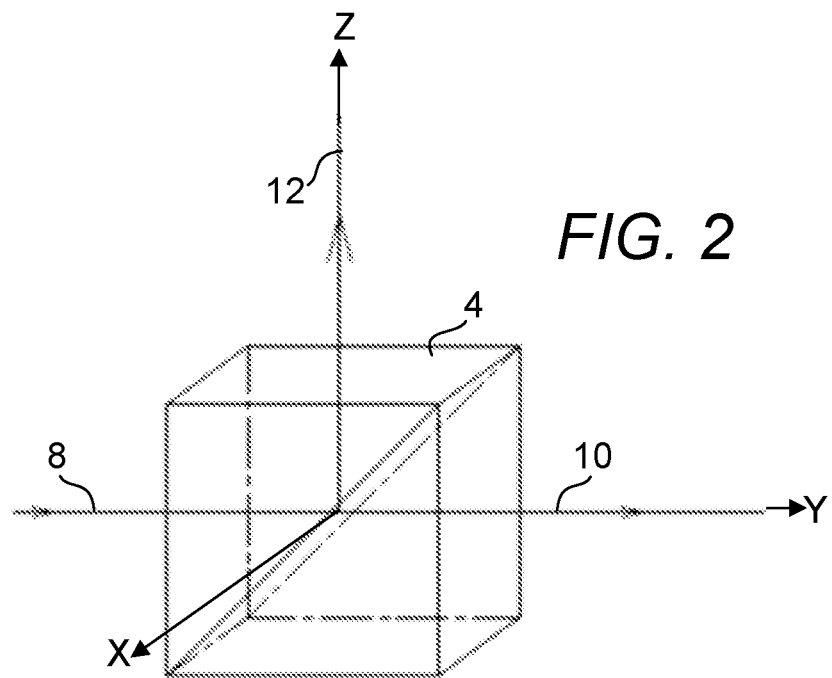
FIG. 2 is a diagram depicting the results of directing an incident ray upon a beam splitter.
Figure 3:
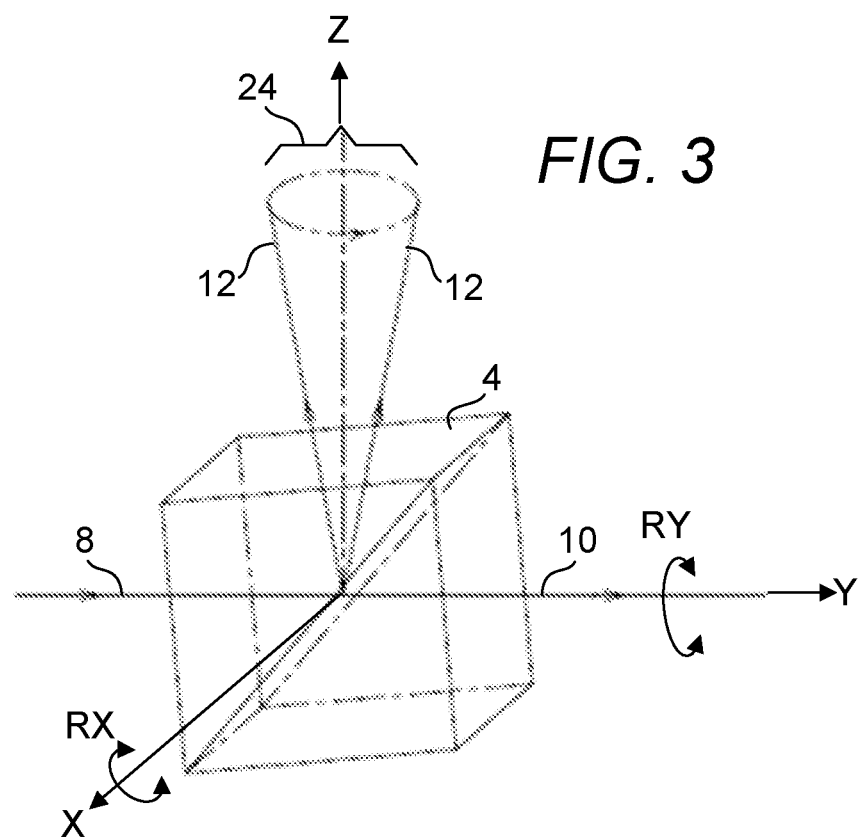
FIG. 3 is a diagram depicting the results of directing an incident ray upon a beam splitter configured to be rotatable about two axes.

FIG. 2 is a diagram depicting the results of directing an incident ray 8 upon a beam splitter 4. Note that light beam 12 is reflected while light beam 10 is transmitted. FIG. 3 is a diagram depicting the results of directing an incident ray 8 upon a beam splitter 4 configured to be rotatable about two axes, i.e., the X-axis and the Y-axis. Footprint 24 represents the possible coverage of the reflected beams 12 if a certain range of rotation about the X-axis and a certain range of rotation about the X-axis are exerted on the beam splitter 4.

Figure 4:
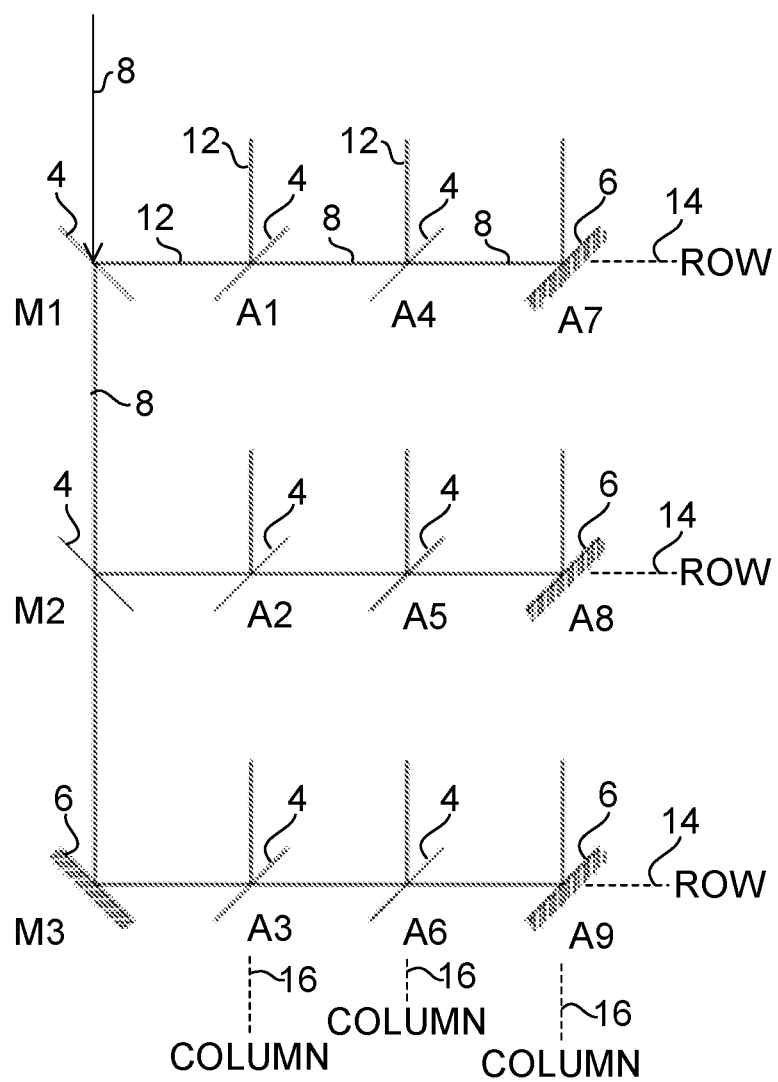
FIG. 4 is a diagram depicting a distribution of optical elements substantially within a plane which the incoming beam to the reflector device is directed.

FIG. 4 is a diagram depicting a distribution of optical elements substantially within a plane which the incoming beam to the reflector device is directed. Referring to both FIGS. 1 and 4, it shall be noted that as the incident light beam 8 enters the reflector device 2 via the entrance pupil 18, beam splitter M1 splits the beam 8 into a light beam 12 reflected by it to beam splitter A1 and a light beam 8 that is transmitted to beam splitter M2. Light beam 8 is then split into two beams at beam splitter A1, one of which is transmitted to beam splitter A4 and the other light beam is reflected by beam splitter A4 as light beam 12. Eventually the transmitted light beam from beam splitter M3 is reflected with a mirror 6 labelled A7 which is disposed at the end of the first row of the optical elements 4, 6. A mirror 6 is used at A7 as it is required to reflect its incident light beam to an optical element disposed in another plane, i.e., the second plane 40. The light beam transmitted to beam splitter M2 is reflected by beam splitter M2 along the second row 14 of the optical elements 4, 6 or beam splitters A2, A5 and mirror A8 in a manner similar to the manner the light beam was split or transmitted along the first row. The light beam transmitted to mirror M3 is reflected along the third row of optical elements 4, 6 or beam splitters A3, A6 and mirror A9, again, in a manner similar to the manner the light beam was split or transmitted along the first row. As with mirror A7, the reflected light beams of each of A1, A4, A2, A5, A8, A3, A6 and A9 is directed to a corresponding optical element of the second plane 40 although they are shown in the same plane as the optical elements of the first plane for ease of demonstrating the light beams that are transmitted and light beams that are reflected. In one embodiment, at least one of the optical elements of the plurality of rows of optical elements in the first plane is an optical element disposed in two degrees of freedom in its movement, i.e., tip and tilt or rotation about the X-axis (RX or tip) and rotation about the Y-axis (RY or tilt) according to the coordinate system specified in FIG. 1. Referring back to FIG. 1, each optical element of the first plane 38 is configured to be rotatable about the X and Y-axes to cause an angle of rotation with respect to the X-axis and an angle of rotation with respect to the Y-axis. In one embodiment, at least one of the plurality of rows of optical elements in the first plane 38 are preferably configured to be substantially aligned in the Z-direction with the plurality of rows of optical elements 6 in the second plane 40, e.g., within about 1-5 cm. For instance, optical element A1 of the first plane 38 is coupled in its function to optical element B1 of the second plane 40 and optical element A9 of the first plane 38 is coupled in its function to optical element B9 of the second plane 40. In other words, for instance, to create a requested output light beam at a location and an orientation that can be met using optical elements A1 and B1, the two elements A1 and B1 are positioned and orientated in their respective manner to create that unique output light beam 12, 20. An exception to such pairing in function is a scenario illustrated in the case of optical element B5. Here, optical element A5 is already capable of providing a requested output beam without the involvement of optical element B5. Note that this output beam is shown as output beam 12 as it is a reflected light beam of a beam splitter, i.e., beam splitter A5. As shown herein, up to nine output beams can be generated simultaneously as there are nine pairs (three columns by three rows) of cooperating optical elements distributed over the two planes.

Figure 5:
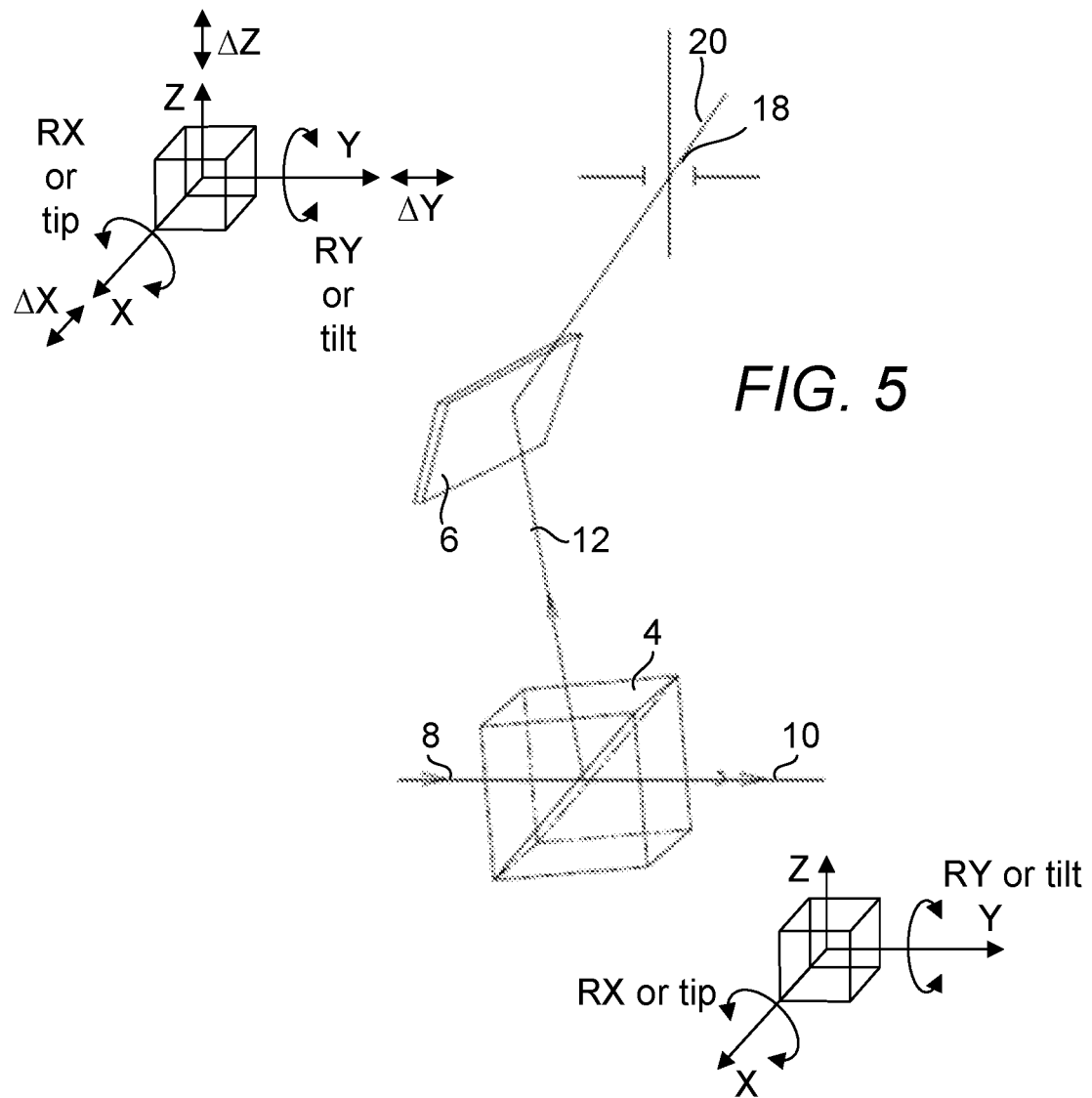
FIG. 5 is a diagram depicting a manner in which an incident beam is redirected by a beam splitter and a mirror.

FIG. 5 is a diagram depicting a manner in which an incident beam is redirected by a beam splitter 4 of the first plane 38 and a mirror of the second plane 40. Referring to both FIGS. 1 and 5, all of the plurality of rows 14 of optical elements in the second plane are mirrors 6. Although the second plane 40 is useful for representing the optical elements 6 that redirect incident light beams from the optical elements of the first plane 38, the optical elements of the second plane 40 do not necessarily operate within this plane 40 as the mirrors 6 are configured for five degrees of freedom, i.e., translations in the X, Y and Z-directions or along X, Y and Z-axes (AX, AY, AZ) and a rotation about the X-axis (RX or tip) and a rotation about the Y-axis (RY or tilt) according to the coordinate system specified in FIG. 1. In one embodiment as shown in FIGS. 1 and 4, each row of the first plane 38 includes four optical elements and each row of the second plane 40 includes three optical elements. For ease of referencing the optical elements, the first plane 38 can be treated as having three columns 16 of optical elements and the second plane 40 can be viewed as having three columns 16. It shall be noted that the optical elements M1, M2 and M3 are useful for directing the incoming beam at the entrance pupil 18 to the optical elements of all of the columns 16. As the optical elements are distributed roughly in a grid format in each plane, the transitional and rotational motions that are required of the optical elements in producing any required output beams do not involve traversal of any significant distances and rotations. A required output beam can therefore be generated rapidly and without delay. In one application, a reflector device useful for general arbitrary output beams includes the number of rows and columns of optical devices shown herein. However, a reflector device need not have the same number of columns and rows of optical elements shown herein. In general, a wider footprint coverage of output beams will require an increased number of optical elements. Techniques for causing translational and rotational motions are well known in the art, e.g., by means of linear and rotational motors and solenoids, etc.

Figure 6:
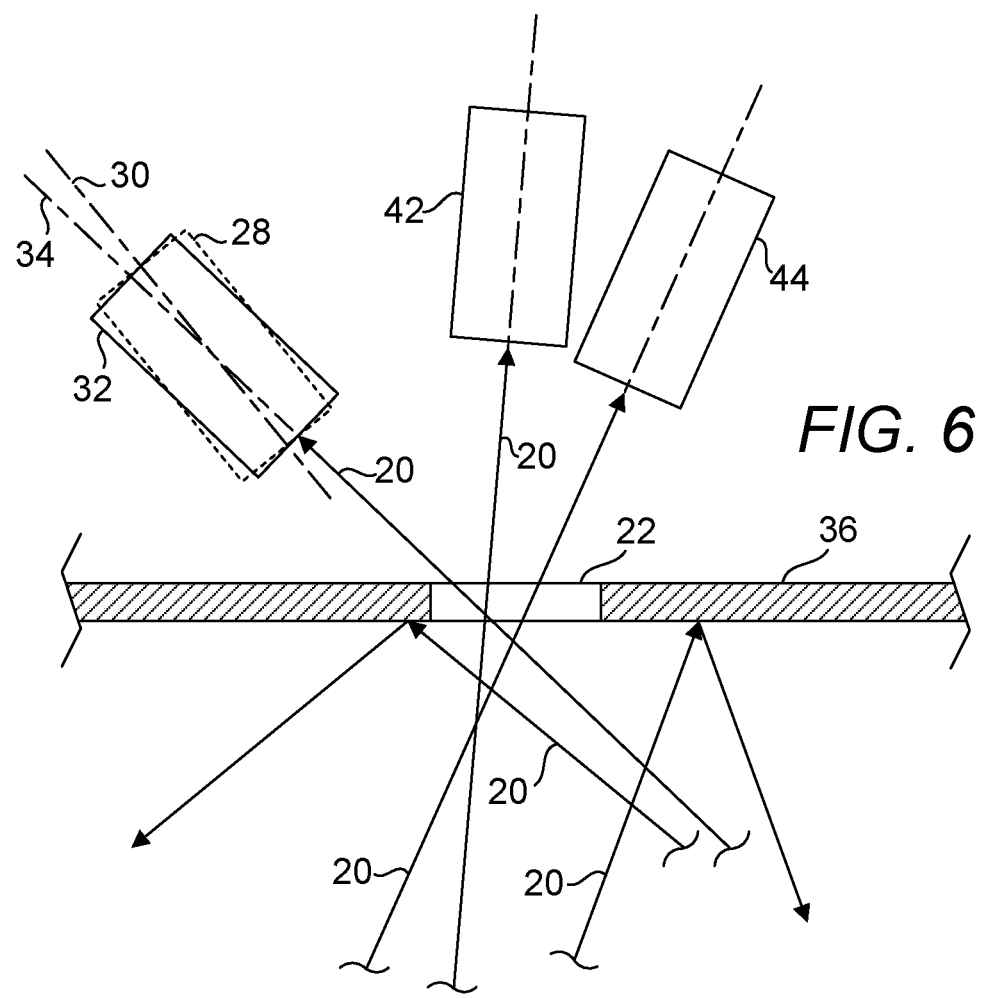
FIG. 6 is a diagram depicting a manner in which errant output beams are addressed using the present reflector device and a manner in which an output beam of the present reflector device is used.

FIG. 6 is a diagram depicting a manner in which errant output beams are addressed using the present reflector device and a manner in which an output beam of the present reflector device 2 is used. In one embodiment, the exit pupil 22 is disposed in a circular shape and at a diameter of about 1-2 mm. With the limited size of the exit pupil 22, only the output beams that are intended to be provided outside of the reflector device 2 will be made available. This way, any unintended output beams are contained and stopped from exiting the reflector device 2, eliminating any errant output beams and preserving the precision of the output beams that are requested. It shall be noted that the light beams 20 not aligned with the exit pupil 22 are reflected back into the reflector device 2. Shown herein is an equipment 28 having an orientation that is to be calibrated. The equipment is shown disposed in an orientation represented as 30. The target orientation to which the equipment is to be calibrated is represented as 34. While disposed in orientation 30, the output beam 20 may not be detected in the equipment as it is mis-aligned. Upon making adjustments to the orientation of the equipment 28, the equipment 32 is now capable detecting the output beam 20 as it is now aligned precisely with the output beam 20. Shown herein are other output beams 20 that are requested to be aligned with equipment 42 and 44 at the same time as the output beam 20 requested as a guide for calibrating equipment 32.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A device for providing an output beam in a direction, said device comprising:
    (a) a plate comprising an exit pupil;
    (b) a plurality of rows of optical elements disposed substantially in a first plane, each row of optical elements in said first plane comprising: at least one beam splitter; and
    (c) a plurality of rows of optical elements disposed substantially in a second plane, said optical elements in said second plane comprise mirrors, wherein said second plane is disposed between said exit pupil and said first plane,
    wherein said at least one beam splitter at said first plane is configured to transmit an incident beam to one of a subsequent optical element at said first plane and a subsequent optical element at said second plane before being reflected to exit through said exit pupil.

2. The device of claim 1, wherein at least one of said optical elements of said plurality of rows of optical elements in said first plane is an optical element disposed in two degrees of freedom in its movement and at least one of said optical elements of said plurality of rows of optical elements in said second plane is an optical element disposed in five degrees of freedom in its movement.

3. The device of claim 2, wherein said two degrees of freedom comprises tip and tilt and said five degrees of freedom comprises translations in X, Y and Z-directions, tip and tilt, wherein said X, Y and Z-directions are mutually orthogonal and said tip is a rotation about said X-direction and said tilt is a rotation about said Y-direction.

4. The device of claim 1, wherein all of said plurality of rows of optical elements in said second plane are mirrors.

5. The device of claim 1, wherein at least one of said plurality of rows of optical elements in said first plane is configured to be substantially aligned with a row of said plurality of rows of optical elements in said second plane.

6. The device of claim 1, wherein said exit pupil is disposed in a circular shape and at a diameter of about 1-2 mm.

7. The device of claim 1, wherein at least one of said plurality of rows of optical elements in said first plane comprises three optical elements and at least one of said plurality of rows of optical elements of said second plane comprises three optical elements.

8. A device for providing an output beam in a direction, said device comprising:
(a) a plate comprising an exit pupil;
(b) a plurality of rows of optical elements disposed substantially in a first plane, each row of optical elements in said first plane comprising: at least one beam splitter; and
(c) a plurality of rows of optical elements disposed substantially in a second plane, said optical elements in said second plane comprise mirrors, wherein said second plane is disposed between said exit pupil and said first plane,
wherein said at least one beam splitter at said first plane is configured to transmit an incident beam to one of a subsequent optical element at said first plane and a subsequent optical element at said second plane before being reflected to exit through said exit pupil and at least one of said optical elements of said plurality of rows of optical elements in said first plane is an optical element disposed in two degrees of freedom in its movement and at least one of said optical elements of said plurality of rows of optical elements in said second plane is an optical element disposed in five degrees of freedom in its movement.

9. The device of claim 8, wherein said two degrees of freedom comprises tip and tilt and said five degrees of freedom comprises translations in the X, Y and Z-directions, tip and tilt, wherein said X, Y and Z-directions are mutually orthogonal and said tip is a rotation about said X-direction and said tilt is a rotation about said Y-direction.

10. The device of claim 8, wherein all of said plurality of rows of optical elements in said second plane are mirrors.

11. The device of claim 8, wherein at least one of said plurality of rows of optical elements in said first plane are configured to be substantially aligned with said plurality of rows of optical elements in said second plane.

12. The device of claim 8, wherein said exit pupil is disposed in a circular shape and at a diameter of about 1-2 mm.

13. The device of claim 8, wherein at least one of said plurality of rows of optical elements in said first plane comprises three optical elements and at least one of said plurality of rows of optical elements of said second plane comprises three optical elements.

* * * * *